US006215057B1

(12) United States Patent
Oren-Chazon

(10) Patent No.: US 6,215,057 B1
(45) Date of Patent: *Apr. 10, 2001

(54) SOUND GENERATING EDUCATIONAL MUSICAL TOY AND TEACHING DEVICE

(76) Inventor: Dorly Oren-Chazon, 2600 Netherland Ave. #1520, Riverdale, NY (US) 10463

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/079,113

(22) Filed: May 14, 1998

(51) Int. Cl.[7] ............................ G09B 15/00; A63H 3/00; A63H 5/00

(52) U.S. Cl. ......................... 84/470 R; 446/268; 446/270

(58) Field of Search ................................. 84/470 R, 476, 84/477 R; 446/268, 270, 297, 397

(56) References Cited

U.S. PATENT DOCUMENTS 491,833 2/1893 Bowen et al. ......................... 84/476
672,678 4/1901 Kitching ............................. 84/470 R
1,133,773 * 3/1915 Widdis ............................... 84/470 R
1,309,915 7/1919 Siegel ................................... 446/268
1,337,937 * 4/1920 Maxwell ............................ 84/470 R
1,571,868 2/1926 Parsons .............................. 84/470 R
2,731,871 * 1/1956 Loughrie ............................ 84/470 R
2,879,685 3/1959 Page ................................... 84/470 R
2,888,849 6/1959 Humphrey et al. ................... 84/1.01
3,186,291 * 6/1965 Pedicano ............................ 84/470 R
3,196,731 7/1965 Ingley .................................... 84/476
3,477,332 11/1969 Kreiss .................................... 84/403
3,538,620 * 11/1970 Kohner et al. ............................. 35/8
3,595,121 7/1971 Magers ............................... 84/470 R
3,742,642 7/1973 Zegers-Ten Horn ..................... 46/13
3,795,989 * 3/1974 Greenberg et al. .................... 35/9 B
3,977,292 8/1976 Favilli et al. ...................... 84/470 R
4,114,501 9/1978 Tanaka .................................. 84/330
4,121,488 * 10/1978 Akiyama ............................... 84/1.01
4,203,344 * 5/1980 Krosnick ............................ 84/470 R
4,271,744 6/1981 Kulesza ................................. 84/330
4,733,591 3/1988 Kaneko et al. .
4,781,099 * 11/1988 Koike ................................. 84/470 R
4,827,826 * 5/1989 Isashi ................................. 84/470 R
4,924,743 5/1990 Tsai ........................................ 84/476
5,011,412 * 4/1991 Rosenberg ........................... 434/227
5,145,447 * 9/1992 Goldfarb ............................. 446/408
5,188,533 2/1993 Wood .................................. 434/169
5,415,071 5/1995 Davies ............................ 84/471 SR
5,438,154 8/1995 Segan et al. .
5,501,601 * 3/1996 Todokoro et al. .................. 434/169
5,540,132 7/1996 Hale .................................. 84/470 R
5,545,071 8/1996 Shiraishi .
5,668,333 * 9/1997 Horton et al. ..................... 84/470 R

FOREIGN PATENT DOCUMENTS

658533 * 11/1986 (CH) .
1200658 * 12/1959 (FR) .
2680113 8/1991 (FR) .
2112990 * 7/1983 (GB) .
50-71732 * 10/1977 (JP) .

* cited by examiner

*Primary Examiner*—Robert E. Nappi
*Assistant Examiner*—Marlon Fletcher
(74) *Attorney, Agent, or Firm*—Darby & Darby

(57) ABSTRACT

A music toy or teaching device includes one or more sound generating devices operative to generate sound in a selected output format chosen from plural formats. The music teaching device provides an output format selector that allows a user to select the particular output format in which the sound will be generated. Upon selection of an output format and actuation of a switch corresponding with a particular pitch, the device retrieves from memory the corresponding sound bite in the format and pitch and audibly recreates the sound bite. At least one of the sound bites is the name of one of the notes; "do", "re", "mi", "fa", "sol", "la" or "ti".

2 Claims, 6 Drawing Sheets

FIG. 1

SOUND GENERATING EDUCATIONAL MUSICAL TOY AND TEACHING DEVICE

BACKGROUND OF THE INVENTION

1. Field of the Invention

The present invention relates to a music interactive toy and/or educational tool. More particularly, the present invention relates to such toys and/or educational tools for teaching people of all ages to recognize, by sound and name, the musical notes of the scale.

2. Description of the Prior Art

Music plays a major role in the lives of most people. Music is often a universal language, allowing people who do not speak the same language to nevertheless communicate in one form or another. For many people, listening to music is an enjoyable, often relaxing exercise. However, while children are taught the basics of the speaking language (a, b, c, . . . ) and the numeric language (1, 2, 3, . . . ), very little, if any, emphasis is placed on the musical language (do, re, mi, . . . ). In fact, even musicians, while being extremely skilled at their particular instrument, sometimes have very little knowledge concerning the musical language. Many musicians learn to play by sound without ever associating musical notes with their given names ("do", "re", "mi", "fa", "sol", "la", and "ti").

But most people do not have the natural born talent to learn how to play an instrument without knowing the musical language. Thus, it would be extremely beneficial to begin teaching the musical scale and the names of the musical notes (i.e., "do", "re", "mi", "fa", "sol", "la", and "ti") to children at a relatively young age (even as young as under two years old), when their minds are the most receptive to new information. However, because most children have relatively short attention spans, any effective method of teaching the musical scale to children must hold their attention while simultaneously educating them.

A number of systems and aids have been proposed for teaching the musical scale to children. A form of such a device is disclosed in U.S. Pat. No. 4,114,501 to Tanaka. That device includes plural dolls, each of which has a flexible bellows and a uniquely configured air chamber and air passageway to produce a unique noise in a particular pitch or tone. This device, however, provides no means for varying the sound output by the dolls to cater to different children's interests in an effort to capture and hold their attention.

Another proposed device is disclosed in U.S. Pat. No. 5,540,132 to Hale, and includes plural puppet characters that incorporate tonal devices such as battery powered electronic devices that emit a sound in a tone which corresponds to that of the musical note with which the puppet character is associated. The tonal device is housed inside the puppet and includes a pressure sensitive switch to activate it. This device also suffers from the shortcoming that there is no way to change the output format of the sound being generated depending on the person using the device.

Accordingly, it will be apparent to those skilled in the art that there continues to be a need for an improved music teaching device for teaching people to distinguish musical notes by sound, sight and/or name simultaneously. Furthermore, there exists a need for such a music teaching device that is adaptable to the particular user of the device and to his or her interests. Also, the present invention teaches understanding the relative changes in pitch between the notes by visualizing these changes in a graduated increase in size of the colored dolls, corresponding to each note. The present invention addresses these needs and others.

SUMMARY OF THE INVENTION

Briefly, and in general terms, the present invention provides a music teaching device for teaching users to recognize particular notes by sound and for associating those notes with their musical names ("do", "re", "mi", etc.). The invention includes one or more sound generating devices operative to generate sound in a selected output format chosen from plural formats. The device provides an output format selector that allows a user to select the particular output format in which the sound will be generated. Upon selection of an output format and depression of a button corresponding with a particular pitch, the device retrieves from memory the corresponding sound bite in the format and pitch and audibly recreates the sound bite. At least one of the sound bites is the name of one of the notes; "do", "re", "mi", "fa", "sol", "la", and "ti", Thus, the music teaching device of the present invention in one preferred embodiment comprises: plural playback buttons being manipulable to generate discrete playback signals; a memory device storing sound bites in plural pitches and in plural output formats; an output format selector with plural settings to determine the output format of the sound bite to be generated; a processor in electrical communication with the playback buttons, memory, and output format selector, the processor being responsive to manipulation of one of the buttons and setting of the output format selector to retrieve the corresponding sound bite from the memory; and a sound playback device in communication with the processor and operative to audibly reproduce the sound bite retrieved by the processor.

In an alternative embodiment of the present invention, the device includes figurines or dolls that are releasably mounted on a base unit. The dolls represent one note and the height of the dolls increase sequentially to correlate with its assigned note. Also, preferably, each doll is decorated in a particular color, with the three most dominant notes, "do", "fa" and "sol" being represented by the three most dominant colors yellow, blue and red, respectively. By coloring the dolls in accordance with yellow, blue and red, their importance within the scale, the dolls color correspond in domination sequence to the domination sequence of the notes.

In accordance with a further embodiment of the present invention, the device can create the sound bite in the basic terms of music, such as, for example, varying pitch (e.g., high, low), dynamic (e.g., piano, forte), rate or tempo (e.g., slow, fast), duration (e.g. beats per second), half-notes, etc.

Other features and advantages of the present invention will become apparent from the following detailed description, taken in conjunction with the accompanying drawings which illustrate, by way of example, the features of the present invention.

DETAILED DESCRIPTION OF THE PREFERRED EMBODIMENT

Figure 1:
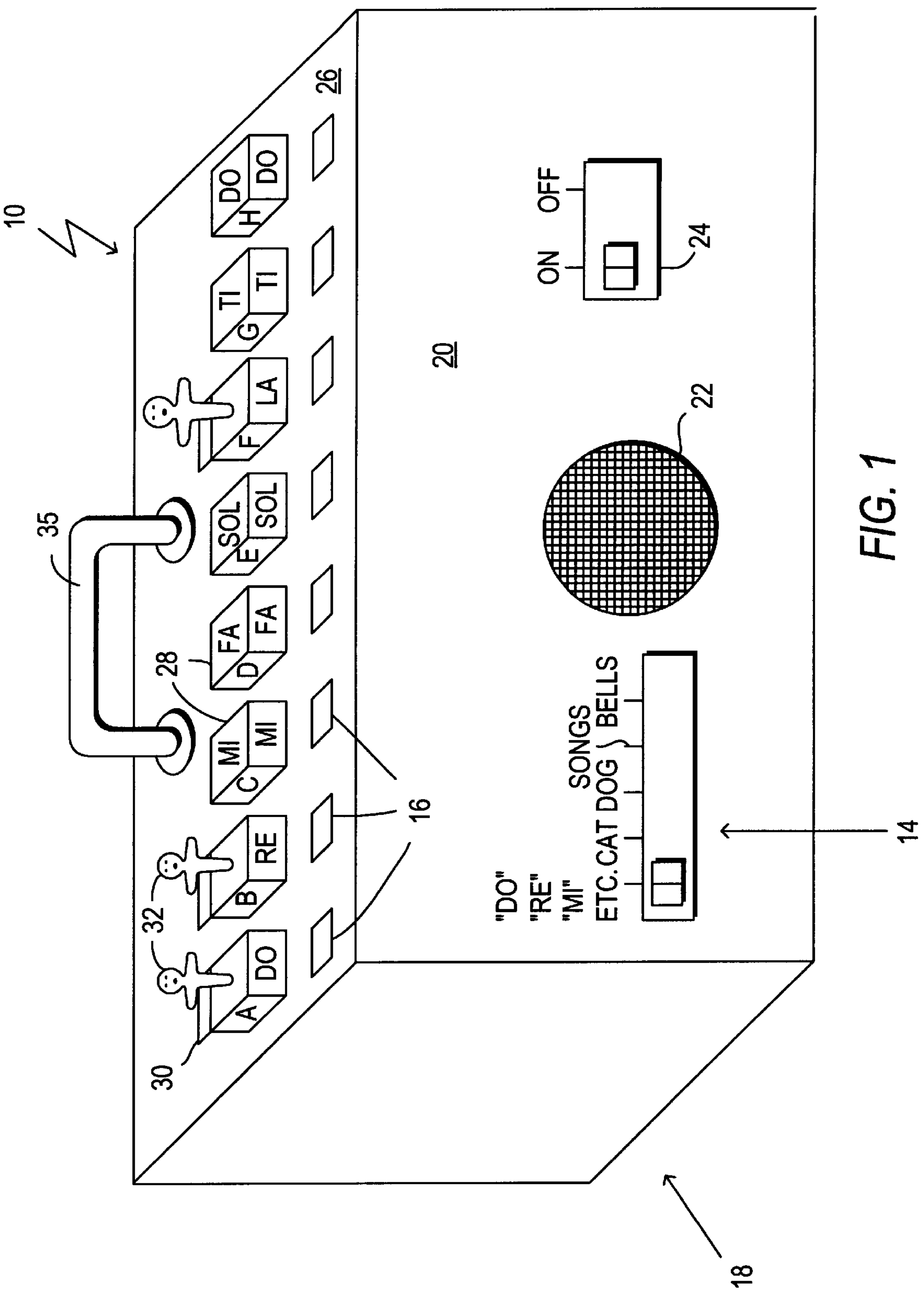
FIG. 1 is a perspective view of a preferred embodiment of the music teaching device of the present invention.
Figure 2:
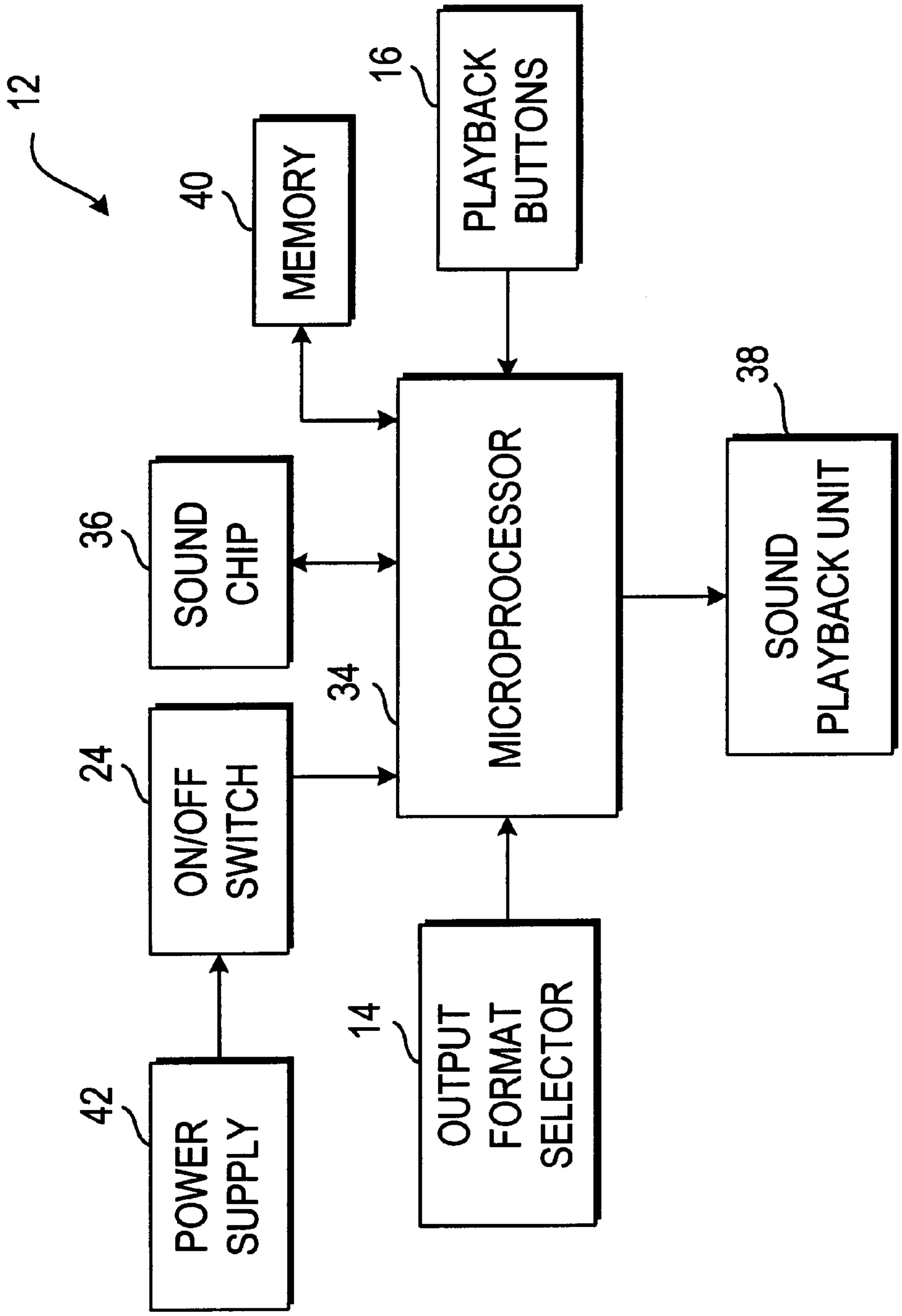
FIG. 2 is a block diagram of electronic components included in the music teaching device of FIG. 1.

In the following detailed description, like reference numerals will be used to refer to like or corresponding elements in the different figures of the drawings. Referring now to the drawings, and particularly to FIGS. 1 and 2, there is shown, generally, a music teaching device 10 comprising one preferred embodiment of the present invention. The music teaching device includes one or more sound generating devices 12, an output format selector switch 14, and plural playback buttons or switches 16. Thus, a user may select a desired output format and sequentially depress one or more of the buttons in order to generate one or more sounds in the corresponding pitches and in the selected output format.

The music teaching device 10 includes a generally rectangular housing 18. The housing includes a front face 20 in which is mounted the output format selector switch 14, a speaker 22, and an on-off switch 24, the on-off switch being operative to selectively empower the music teaching device, as described in greater detail below. The housing still further includes a top wall 26 in which is mounted the plural playback buttons 16. A handle 35 is connected, for example, to top wall 26 to permit the device 10 to be carried by a user. The top wall is further formed with plural receptacles (not shown), each of which is configured to releasably engage a respective box 28 formed with a hinged lid 30, as described in greater detail below.

The output format selector 14 is preferably in the form of a slide switch (FIG. 1) with plural settings corresponding to different outputs. As shown in FIG. 1, and meant solely as examples of possible output formats, the settings may correspond with the names of the notes ("do", "re", "mi", "fa", "sol", "la", and "ti"), a cat's meow, a dog's bark, a particular song, or a musical instrument, such as, for example, bells. It will be apparent that the settings could correspond with any desired output. For example, the sound output could be the sound of a piano or other instruments. The notes could sound as "do", "re", "mi" "fa", "sol", "la", and "ti" or as "A", "B", "C", "D", "E", "F" and "G" as the notes are currently taught in the United States. Additionally, the sound can be emitted, for example, in the legato or staccato style. Additional rhythms, as in conventional synthesizers, can be played. In addition, in place of a slide switch, a knob with multiple settings could be used. Movement of the slide switch to one of the settings results in the generation of a corresponding signal, as described in greater detail below.

Each of the buttons 16 correspond to one of the boxes 28, such that depression of one of the buttons causes the lid 30 of that box to open, allowing a doll 32 to project outwardly therefrom. Depression of the button also results in the generation of an identifiable signal transmitted to the sound generating device 12, as described in greater detail below. For example, if switch 14 is aligned with the "song" output, when a user depresses a button, that figurine will sound out the first word in the song in the particular note assigned to that button/doll. Thereafter, the next button that is depressed will result in the next word of the song being sounded in that second depressed button's assigned note. In this manner, the user will be making or composing his or her own music. Additionally, if desired, the device can include a recording device to record the music composed by the user so that the recorded music can be played back.

Each of the boxes 28 includes indicia printed thereon, preferably in the form of the names of the notes of the scale (i.e., "do", "re", "mi", etc.) on both the side and top of the box. The boxes are arranged from left to right, as shown in FIG. 1, in order from the lowest note ("do") to the highest note ("ti"). Each of the dolls 32 is formed with a different height, with the shortest doll being housed in the "do" box, and the tallest doll in the "ti" box. The eighth box is for the note "do" from the next scale. In addition, each doll is preferably colored with a different color to assist a user in associating the dolls with the different musical notes. The higher the note, the larger or higher the doll. Preferably, each doll is decorated in a particular color, with the three most dominant notes "do", "fa" and "sol" being represented by the three most dominant colors; yellow, blue and red, respectively. The remaining notes can be represented by sequentially less dominant colors. For example, "re", "mi", "la" and "ti" are preferably represented by dark green, light green, orange and purple. "Do" from the next scale or octave would be light blue.

Referring now to FIG. 2, there is shown a block diagram of the electronic components included in the sound generating device 12. The sound generating device includes a microprocessor 34, a sound bite storage device 36, preferably in the form of a sound chip, a sound playback unit 38, and memory 40. The special features of the sound generating devices are implemented, in part, by software programs stored in the memory 40. The software programs are stored in one or more preselected data files and are accessible by the processor, the function of which is described in greater detail in connection with FIG. 3. The memory preferably takes the form of a non-volatile memory device, such as a magnetic or optical storage unit or the like.

The sound chip 36, of well known design, includes a standard digital memory unit (not shown) and is controlled by the processor 34 to access and retrieve a particular sound bite data file stored in the memory unit at a location indicated by an entry in an association table included in the memory of the sound chip (FIG. 5), which is discussed in more detail below. Thus, the proper sound bite may be obtained by referring to the association table and looking for the user-selected parameters. Alternatively, a sound card or other similar device could be utilized in place of the sound chip.

The sound playback unit 38 includes the speaker 22 mounted on the front face 20 of the housing 18, an amplifier, and a digital-to-analog converter to convert the digital sound data retrieved from the sound chip 36 into an analog signal. The amplifier then amplifies the converted analog signal and transmits the amplified analog signal to the speaker for playback.

The on-off switch 24 is operative to selectively transmit power from a power supply 42 to the microprocessor 34. The power supply is preferably a battery, but may take virtually any other form.

Figure 3:
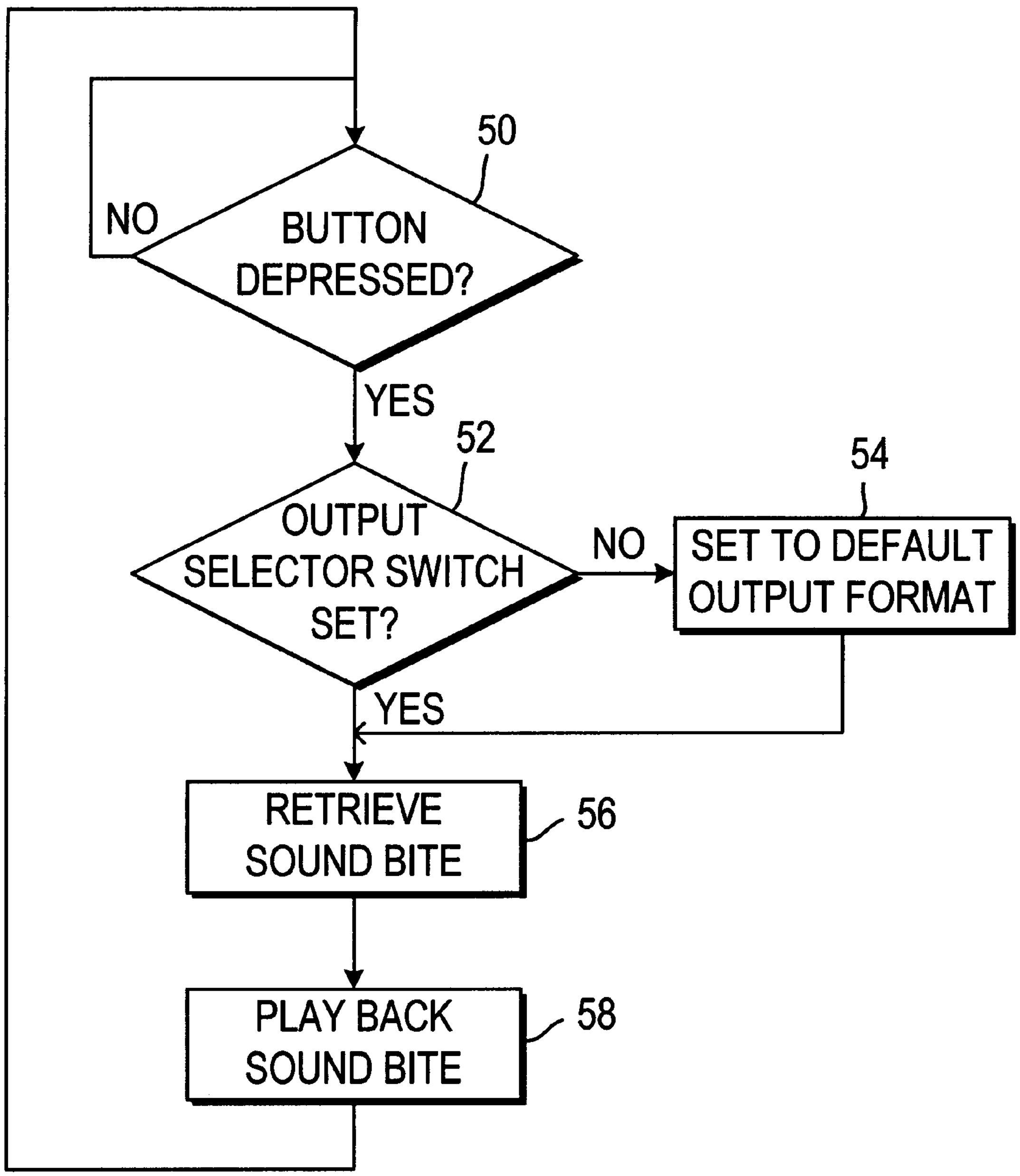
FIG. 3 is a flow chart of the operation of the music teaching device of FIG. 1.

Referring now to FIG. 3, the operation of the music teaching device 10 will be described in greater detail. After the device has been actuated by moving the on-off switch 24 to the "on" position, the processor 34. waits for one of the playback buttons 16 to be depressed, at query block 50. Once one of the playback buttons has been depressed, operation flows to query block 52, and the processor determines whether the output format selector 14 has been set to a particular output format. If the selector has been set to an output format, then operation flows to function block 56, and the processor retrieves from the sound chip 36 the corresponding sound bite in the desired output format and pitch. If not, then at function block 54 a default output format is selected, and operation flows to function block 56 where the processor retrieves the corresponding sound bite in the default output format. The default output format could be the actual name of the note in the note's pitch, or any other output. The sound bite retrieval is preferably accomplished by utilizing the association table, with the processor matching the data corresponding to the selected output format and particular depressed button with the data in the association table to determine the location of the corresponding sound bite. The processor then retrieves that sound bite and transmits the digital sound bite data to the playback unit 38. At function block 58, the retrieved sound bite is played back by the sound playback unit. The digital sound bite data is converted to an analog signal, amplified, and played through the speaker 22. After the sound bite has been played back, operation flows back to query block 50 to await depression of another one of the buttons 16.

It will be apparent that the music teaching device 10 of the present invention could take many different forms. For example, the device could be embodied in a personal computer, with the computer's microprocessor being programmed to perform the routine described above in connection with FIG. 3. The computer's keyboard or mouse could be used to select the output format and the particular note to be audibly played back. The digital sound bites could be stored in the computer's memory or on a disk that is accessed by the microprocessor through its disk drive.

In a preferred embodiment, each doll 32 includes a separate playback unit 38 and sound chip 36 and is removable from its box 28. In other words, each doll 32 includes a separate processor, memory and playback device to generate notes when detached from the base. Thus, the dolls can be removed from the housing and can still generate notes in their respective pitches upon actuation of a switch located on each doll.

Figure 4:
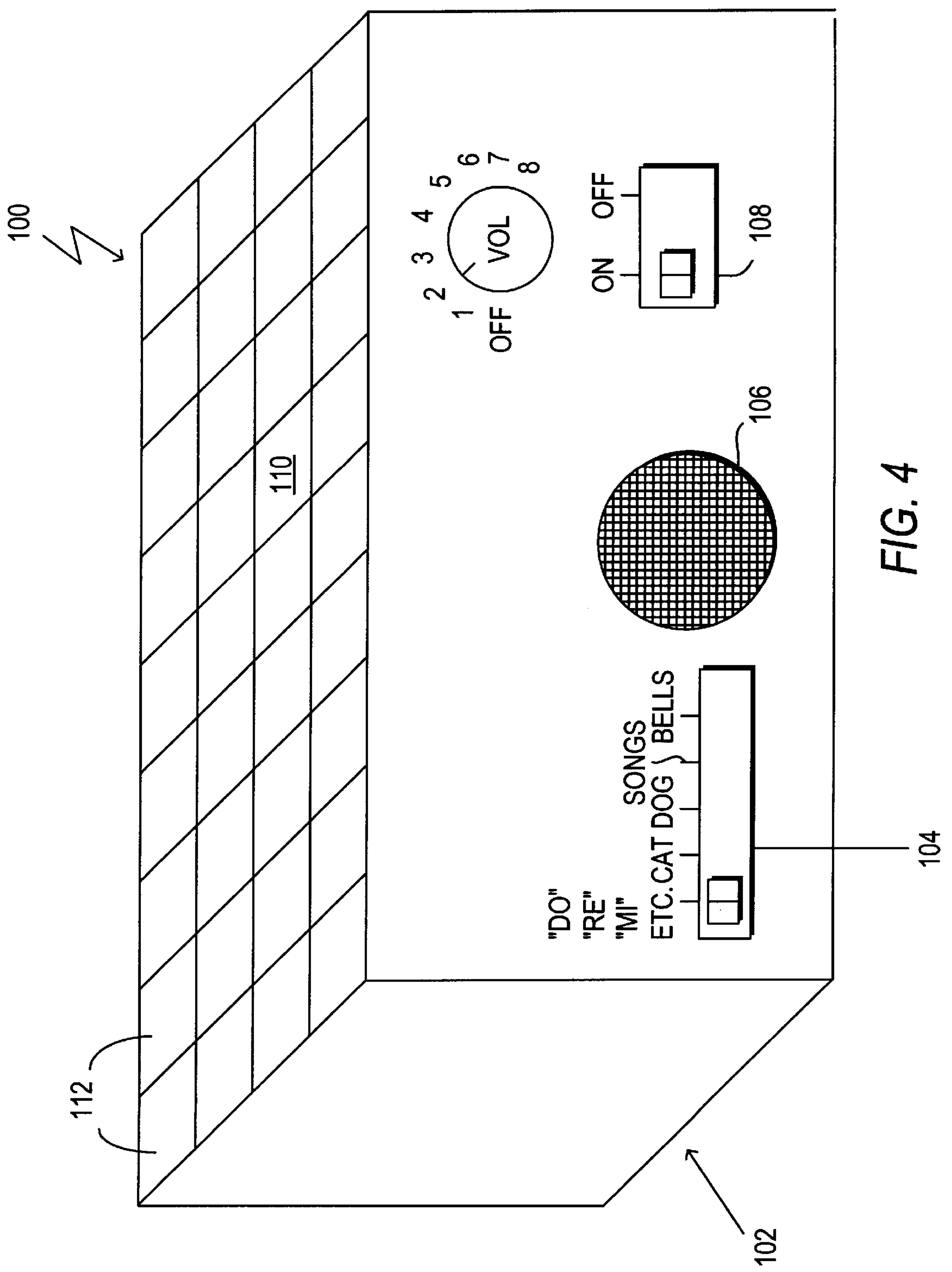
FIG. 4 is a perspective view of an alternative embodiment of the music teaching device of the present invention.

Referring now to FIG. 4, there is shown an alternative embodiment of the music teaching device 100 of the present invention. The device 100 includes a housing 102, an output format selector 104, speaker 106, and an on-off switch 108, all of which are identical to the components included in the device 10 shown in FIG. 1. In place of the buttons 16, boxes 28, and dolls 32, the device 100 includes a top surface 110 partitioned into plural discrete segments 112, each of which corresponds to a particular note. The device is preferably provided with eight columns corresponding to the seven notes (plus the first note "do" being repeated in the next scale), and includes plural rows corresponding to the different octaves of the major scale. Each segment is sensitive to touch (i.e., it either comprises a depressible switch or a touch-sensitive display), such that selection of one of the segments causes the device to audibly generate the corresponding sound bite, as described above.

Figure 5:
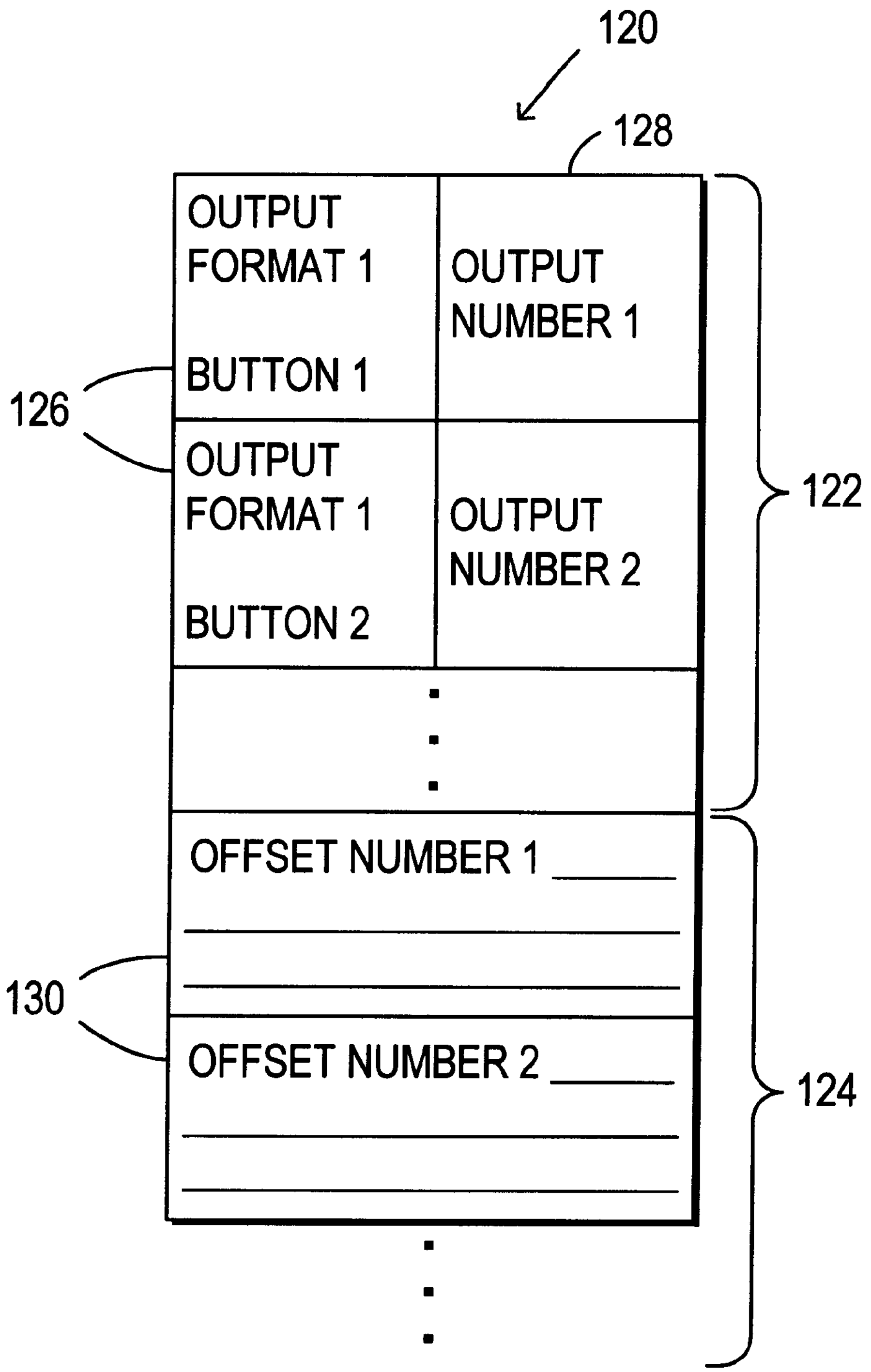
FIG. 5 is a schematic diagram ol a file storage architecture including an association table according to the present invention.
Figure 6:
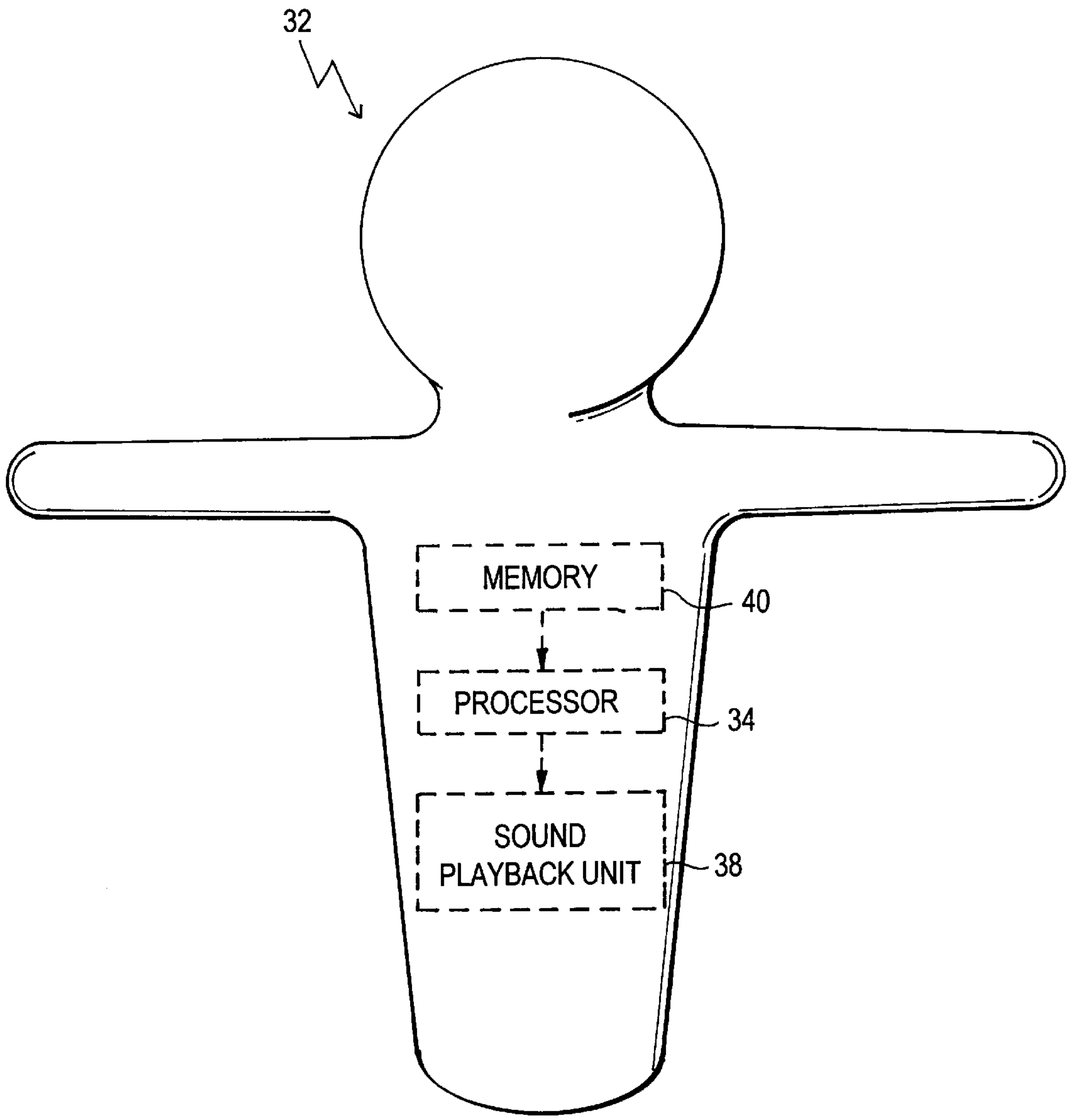
FIG. 6 is a schematic of a figurine.

FIG. 5 shows a file storage architecture 120 comprising an association table section 122 and a sound data storage section 124 used by the microprocessor 34 as described above to locate the proper sound bite. The association table section 122 comprises a series of address lines 126, each of which links an output format and button with a corresponding sound bite by means of an offset address designator 128 which points to a predefined start site in the remainder of the memory where the corresponding sound bite data is stored. Thus the microprocessor 34 simply accesses the association table and searches for the matching output format and button data and, once found, determines the offset location for the desired sound bite. The sound data storage section 124 comprises a series of memory blocks 130, each of which stores sound information comprising a sound bite.

From the foregoing, it will be apparent that the music teaching device 10 of the present invention provides an educational, interactive device for teaching a user to recognize a note by sound, and to associate the note with the note's name. In addition, the music teaching device provides plural output formats to accommodate different user's interests.

While forms of the invention have been illustrated and described, it will be apparent to those skilled in the art that various modifications and improvements may be made without departing from the spirit and scope of the invention. Thus, the present invention is not intended to be limited by the illustrative examples set forth herein. For example, a user can test him or herself by utilizing the device in a "pick the note" mode. The device can randomly sound an audible note, and, thereafter, the user must pick the correct doll or other button or switch that corresponds to the sounded note. In this manner, the user learns to identify notes by sound and by association to a particular size and/or color of a doll. The device can include a record feature so that the sound bites played by the user can be recorded and played back for repeated entertainment. The device can also be operated by remote control, including remote operation of the dolls regardless of whether they are in or out of the base. Further, the device can be input as a computer program or game so that the dolls are illustrated on the screen. The dolls can be actuated by clicking on the doll to hear the preselected output format. Thus, the mouse of the computer can be the playback button and can be used to select the output format. Further, while only one octave has been illustrated for the device, it is clear that two, three or more octaves of notes may be utilized by the device in accordance with the present invention. Additionally, the device may play half-notes.

What is claimed is:

1. The A music teaching device comprising:

a plurality of playback switches being manipulable to generate discrete playback signals; and a memory device storing sound bites in plural pitches and in plural output formats, wherein at least one of the sound bites is the name of one of the notes "do", "re", "mi", "fa", "sol", "la", and "ti", an output format selector with plural settin,s to determine the output format of the sound bite to be generated, wherein at least one of the output formats is the name of one of the notes;

a processor in electrical communication with the playback switch, memory, and output format selector, the processor being responsive to manipulation of one of the switch and setting of the output format selector to retrieve the corresponding sound bite from the memory;

plural figurines;

a base unit housing, the processor, memory, and switch, the base further including plural receptacles configured to engage the respective figurines to mount the figurines to the base unit; and wherein each figurine includes a separate processor, memory, and playback device to generate notes when detached from the base unit.

2. The A music teaching device comprising:

a housing;

a sound generating device housed in the housing and operative to generate sounds in different pitches;

plural playback switches mounted on the housing and in electrical communication with the sound generating device, each switch being manipulable to generate a corresponding playback signal transmitted to the sound generating device;

a memory for storing plural sound bites in the respective pitches and in plural output formats, wherein at least one of the output formats is the name of one of the notes “do”, “re”, “mi”, “fa”, “sol”, “la”, and “ti”;

an output format selector with plural settings to determine the format of the sound bite to be generated, wherein at least one of the output formats is the name of one of the notes “do”, “re”, “mi”, “fa”, “sol”, “la”, and “ti”, the selector being electrically connected to the sound generating device; and the sound generating device comprising a processor in electrical communication with the playback switches, memory, and output format selector, the processor being responsive to manipulation of one of the playback buttons and setting of the output format selector to retrieve the corresponding sound bite from the memory; and the sound generating device further including, a sound playback device in communication with the processor and operative to audibly reproduce the sound bite retrieved by the processor;

plural figurines releasably mounted on the housing and wherein:

the housing includes plural receptacles configured to engage the respective figurines to releasably mount the figurines to the housing; and wherein each figurine includes a separate processor, memory, and playback device.

* * * * *